United States Patent
Ruhl et al.

[15] 3,693,503
[45] Sept. 26, 1972

[54] HYDROSTATIC TRANSMISSION CONTROL WITH HYDRAULIC FOLLOW-UP

[72] Inventors: Charles A. L. Ruhl, Wheaton; Edward Meyer, North Riverside; Probir K. Chatterjea, Des Plaines, all of Ill.

[73] Assignee: International Harvester Company, Chicago, Ill.

[22] Filed: Dec. 14, 1970

[21] Appl. No.: 97,899

[52] U.S. Cl. .................. 91/368, 137/625.69, 60/53 A
[51] Int. Cl. ............................................. F15b 9/10
[58] Field of Search ...................... 91/368; 60/52 VS

[56] References Cited

UNITED STATES PATENTS 2,268,000  12/1941  Treer ...................... 91/368 X
2,613,502  10/1952  Ziebolz et al. ........... 91/368 X
3,543,515  12/1970  Kempson .................. 60/52 VS

*Primary Examiner*—Edgar W. Geoghegan
*Attorney*—Floyd B. Harman

[57] ABSTRACT

A hydraulic follow-up for use with a hydraulic system placed between a rotating input member and a rotating output member. The hydraulic system is a hydrostatic transmission for driving a tractor, and comprises a hydrostatic pump and a hydrostatic motor driven by the pump. When the hydrostatic pump is angularly shifted with respect to the input member, the shifting is controlled by the hydraulic follow-up, which also shifts the motor in relation to the output member.

1 Claim, 6 Drawing Figures

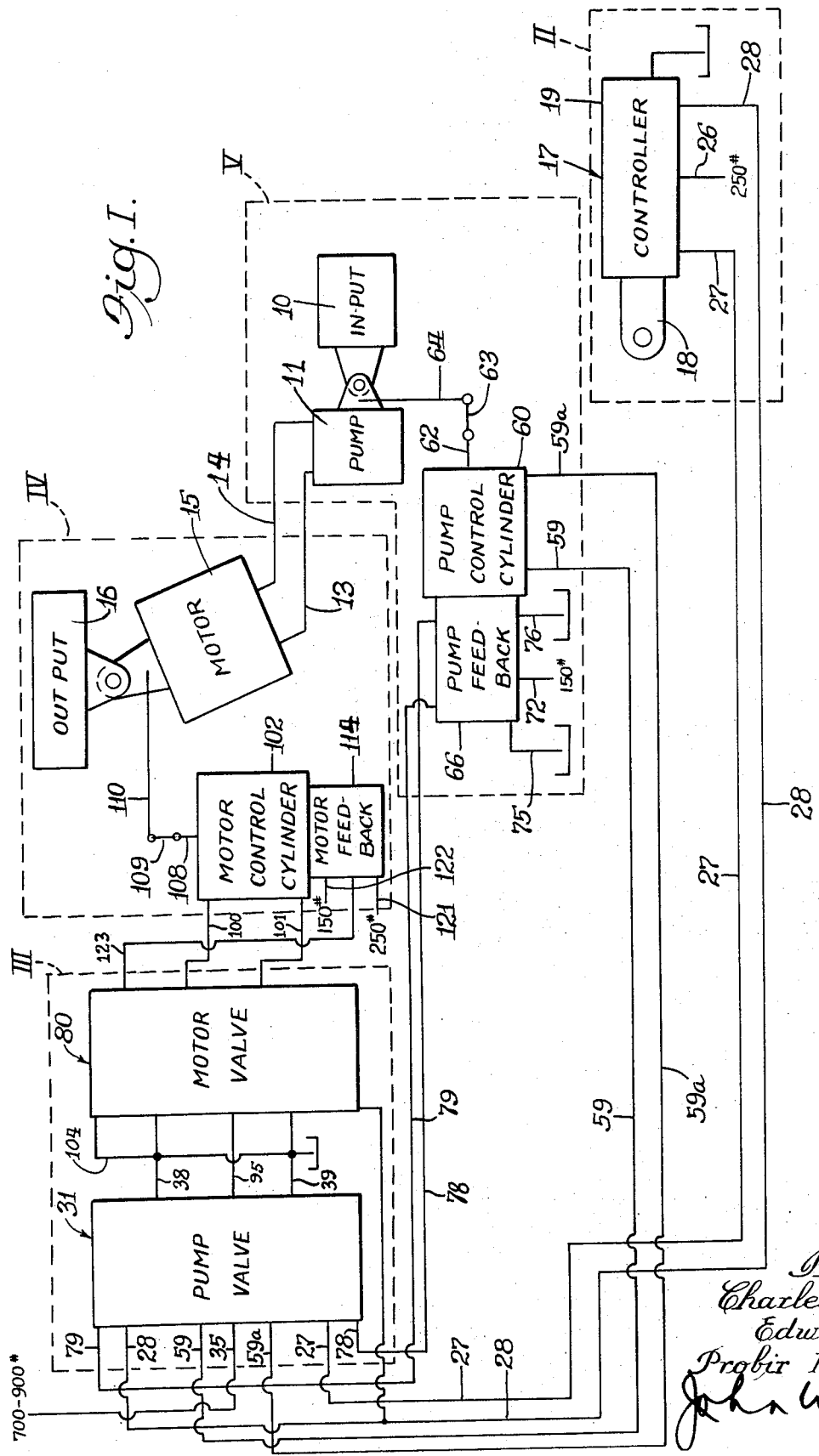

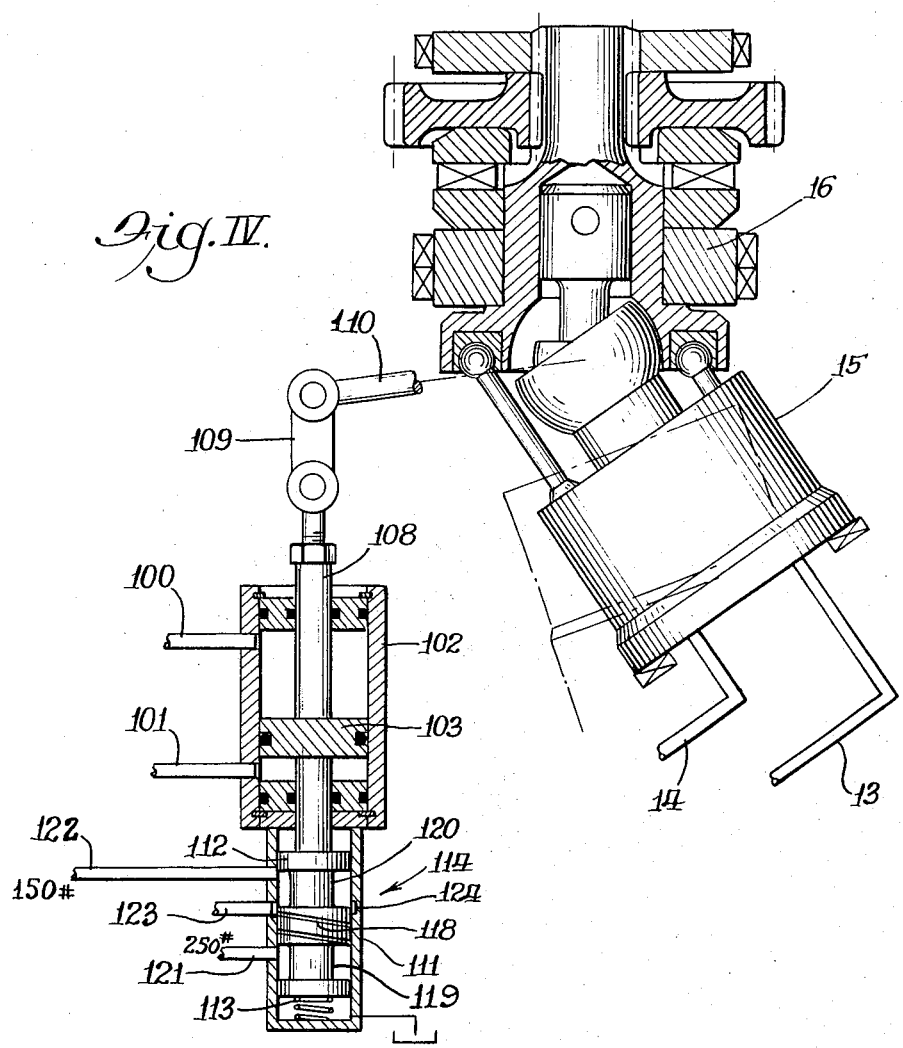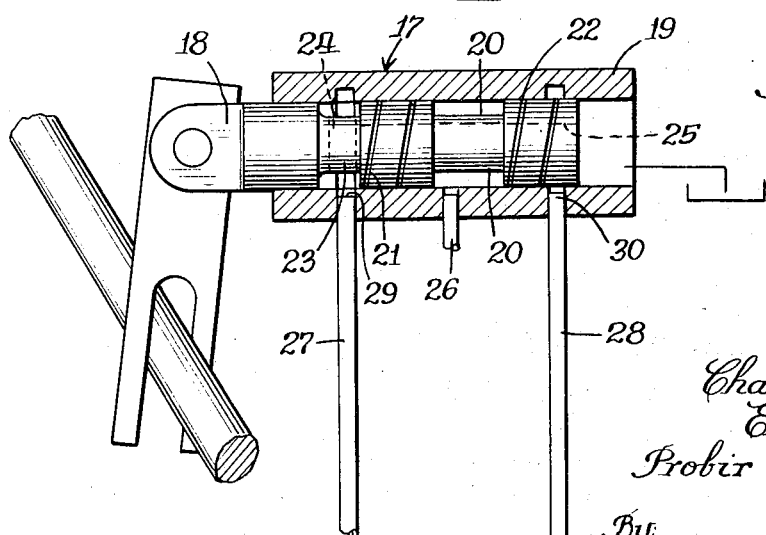

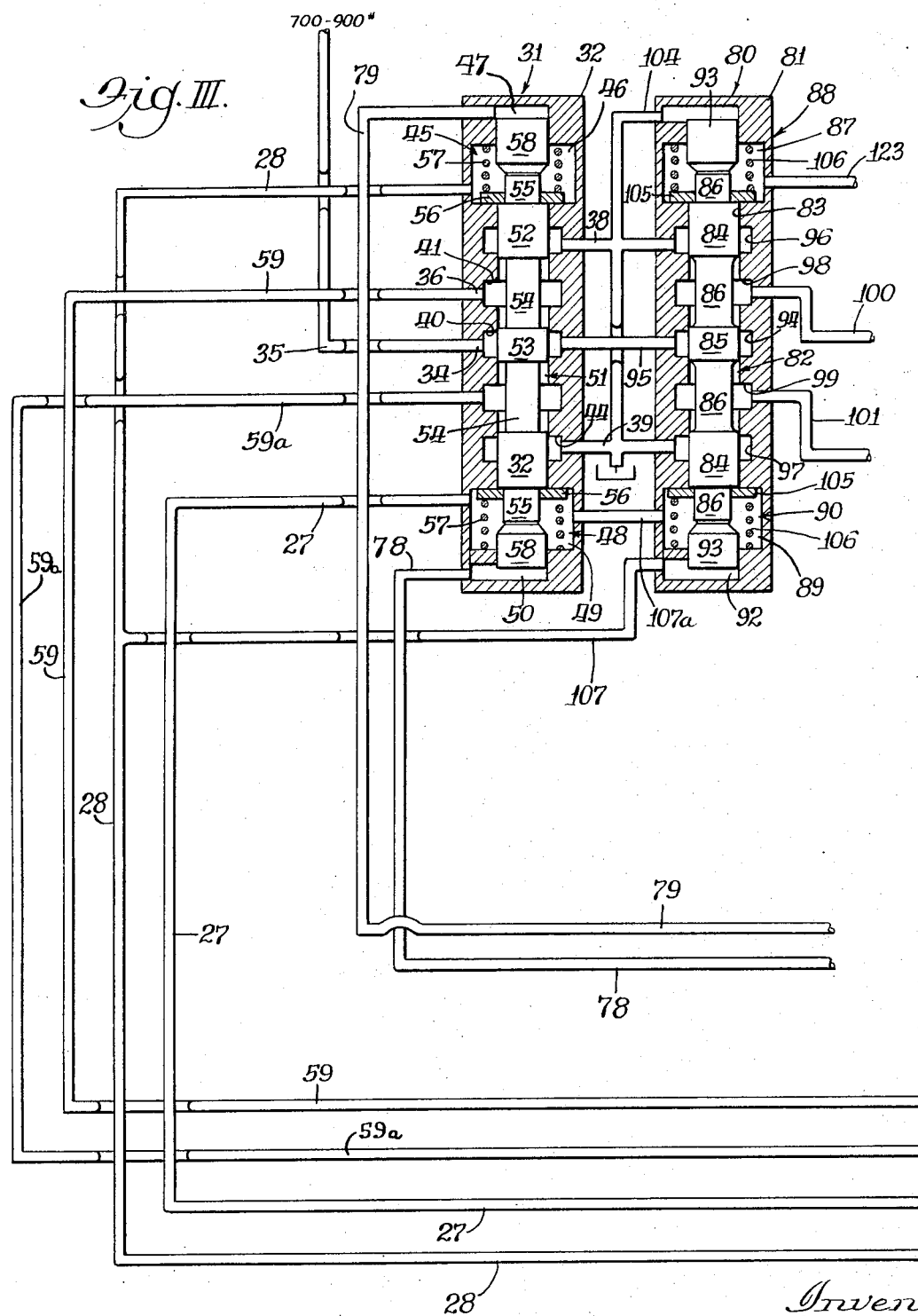

PATENTED SEP 26 1972 3,693,503
SHEET 4 OF 4
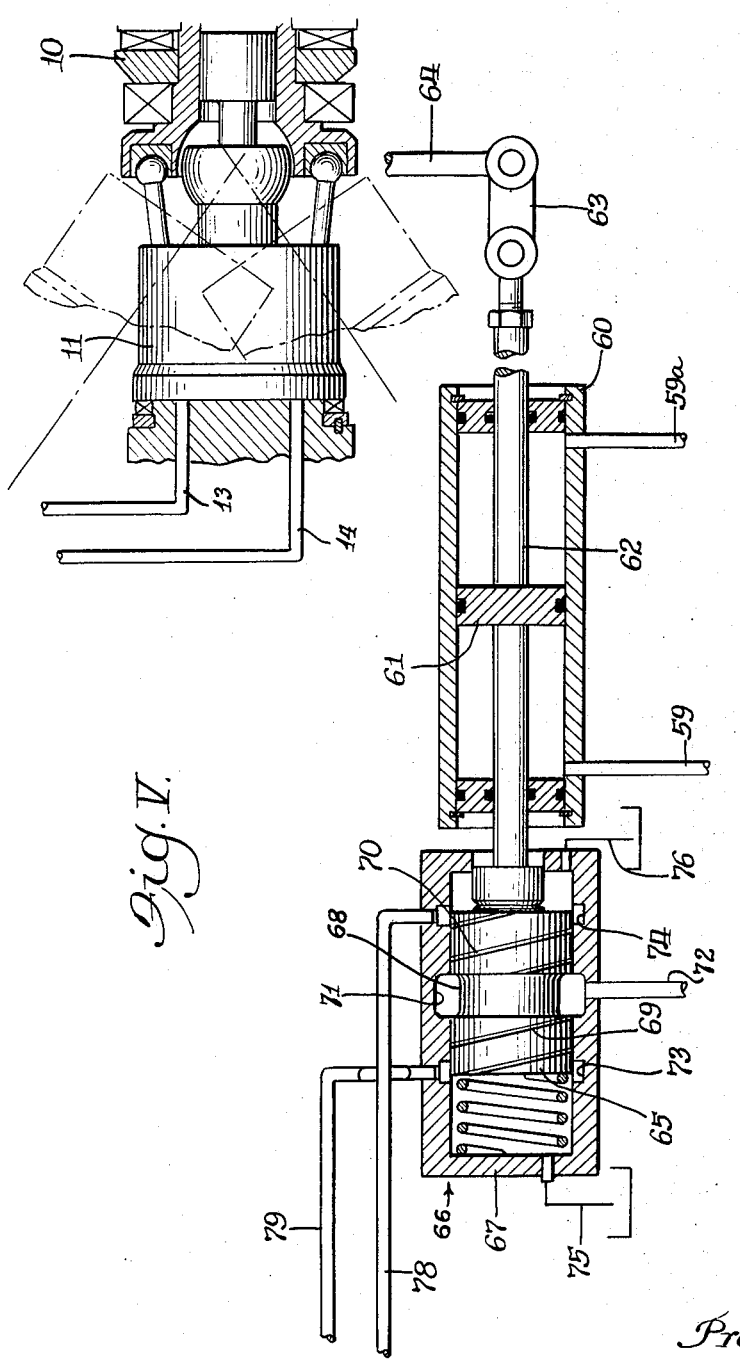
Fig. V.
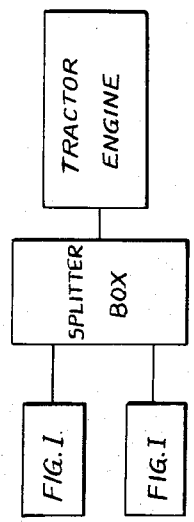
Fig. VI.
Inventors:
Charles A. L. Ruhl
Edward Mayer
Probir K. Chatterjea
By John W. Gaines
Atty.

HYDROSTATIC TRANSMISSION CONTROL WITH HYDRAULIC FOLLOW-UP

This invention relates to a hydraulic follows-up primarily adapted for use in controlling a hydrostatic transmission in a crawler tractor. More specifically, the invention relates to a follow-up system in which different physical positions of master and slave members produce different hydraulic pressures in the hydraulic system, whereby an equalization of hydraulic pressures on the master and slave sides is utilized to stop the shift of the slave member.

Prior follow-up systems in many instances have had mechanical follow-up such as provided by cables and springs for input and feedback signals. The springs forced the systems to take up a great deal of space. There also has been the difficulty of assuring that the springs match one another. Considerable difficulty has also been encountered in seals that were required because of difference in areas against which hydraulic fluid acted in opposite directions, for example, a piston and attached rod in one direction and the piston alone in the other direction. Responsiveness has been adversely affected because of friction losses in the seals.

An object of the present invention is to provide a hydraulic follow-up system in which the aforementioned disadvantages and, specifically, mechanical follow-up are avoided.

Other objects will appear from the detailed disclosure that follows.

In the drawings:

FIG. 1 is a schematic view showing the present hydraulic follow-up system employed in conjunction with a hydrostatic pump, a hydrostatic motor, and rotating input and output members connected thereto;

FIG. 2 is a sectional view of the portion of FIG. 1 enclosed in the dotted outline II and showing a manual controller;

FIG. 3 is a sectional view of the portion of FIG. 1 enclosed in the dotted outline III and showing a pump valve and a motor valve;

FIG. 4 is a sectional view of the portion of FIG. 1 enclosed in the dotted outline IV and showing the output member, the motor, a motor-control cylinder, and a motor feedback;

FIG. 5 is a sectional view of the portion of FIG. 1 enclosed in the dotted outline V and showing the input member, the pump, a pump-control cylinder, and a pump feedback; and FIG. 6 is a showing of a block diagram, as an aid to visualize adapting the invention to be embodied in a track type tractor.

As shown in FIG. 1, a rotating input member 10 connected to the engine of a tractor drives a hydrostatic pump 11. The pump has a tilting head and is connected by lines 13 and 14 for driving a hydrostatic motor 15. The motor has a tilting head and drives a rotating output member 16. The input member 10 and pump 11 are so connected that when they are aligned, as shown in FIG. 1, the pump 11 delivers no fluid. When, however, the head of the pump 11 is angled with respect to the input member 10, the pump in well known way delivers hydraulic fluid through the line 13 to the motor 15, causing it to rotate. The motor 15 and output member 16 are so arranged and connected with one another that the ratio of the speed of the output member 16 to that of the motor 15 is increased as the head of the motor 15 is moved toward axial alignment with the output member 16. One purpose of the apparatus of the present invention is to adjust the angle of the pump 11 with respect to the input member 10 and, in addition, to make the angle of the motor 15 with respect to the output member 16 dependent upon the angle of the pump 11 with respect to the input member 10.

As shown in FIG. 2, a controller 17 is provided which comprises a manually adjustable inner member 18 and a stationary outer member 19 tightly enclosing the inner member 18. The inner member 18 has a wide annular external peripheral groove 20 and two narrow shallow external helical grooves 21 and 22 extending from the ends of the groove 20. The end of the helical groove 22 away from the groove 20 terminates at one end of the inner member 18. The end of the helical groove 21 away from the annular groove 20 terminates at a reduced portion 23 formed on the inner member 18. The reduced portion 23 has a cross passage 24 which is connected with a longitudinal passage 25 in the inner member 18 extending to the end of the inner member 18 adjacent the end of the helical groove 22. A line 26 leading from a source of hydraulic fluid under pressure, for example, about 250 lbs. per square inch, is connected to the outer member 19 so as to be in communication with the annular groove 20 on the inner member 18 in its various positions. Lines 27 and 28 are connected to internal annular peripheral grooves 29 and 30, respectively, which are on opposite sides of and in spaced relation to the connection with the line 26. The grooves 29 and 30 are positioned so as to lie beyond the ends of the helical grooves 21 and 22, respectively, away from the groove 20 when the inner member 18 is in the central position of FIG. 2. When the inner member 18 is shifted from its central position, the groove 29 or 30 overlaps an intermediate portion of the helical groove 21 or 22. Each of the helical grooves 21 and 22 and the interior of the outer member 19 forms a restricted orifice of appreciable length.

VALVE 31, COMPARATOR — FIGURES 1 AND 3

As shown in FIG. 1, the lines 27 and 28 lead from the outer member 19 of the controller 17 to a control apparatus or valve 31 for the pump 11, and more particularly, as shown in FIG. 3, to a housing 32 of the valve 31 near its ends. The housing 32 has a central longitudinal bore 33, a passage 34 leading by a line 35 to a source of hydraulic fluid under pressure, for example, 700 to 900 lbs. per square inch, a pair of delivery passages 36 and 37, and a pair of drain passages 38 and 39. The passages 34, 36, 37, 38, and 39 are connected with the central bore 33 by means of annular grooves 40, 41, 42, 43, and 44, respectively. The housing 32 has at the end where the line 28 is connected, a space 45, which is located beyond one end of the bore 33 and comprises a large near chamber 46 and a small far chamber 47, which are, respectively, near to and spaced from said one end of the bore 33. The large near chamber 46 of the space 45 is enlarged in relation to the bore 33, and the small far chamber 47 of the space 45 is reduced in relation to the large near chamber 46. The housing 32 has at the end at which the line 27 is connected a space 48 which lies beyond the other end of the bore 33. The space 48 is formed of a large near chamber 49 and a small far chamber 50, the chamber 49 being adjacent the said other end of the bore 33 and enlarged in relation thereto, and the chamber 50 being spaced from the said other end of the bore 33 and reduced in relation to the chamber 49. The lines 27 and 28, respectively, are connected with the large chamber 49 of the space 48 in the housing 32 and with the large chamber 46 of the space 45 in the housing.

A movable, pressure comparator member 51 is mounted in the housing 32 and comprises a valve spool, provided with two end lands 52 and a central land 53 spaced from the end lands by reduced portions 54. Beyond the end lands 52, the movable portion 51 has reduced extensions 55 which project into the large chambers 46 and 49 of the spaces 45 and 48. A pair of collars 56 is provided, one being located in the large chamber 46 so as to be engageable with the end thereof adjacent the bore 33 and with a shoulder formed at the juncture of the adjacent extension 55 with the associated end land 52, the other collar 56 being located in the large chamber 49 so as to be engageable with the end thereof adjacent the bore 33 and with a shoulder formed at the juncture of the adjacent reduced extension 55 with the associated end land 52. A pair of springs 57 is located in the large chambers 46 and 49 so as to act against the ends thereof adjacent the small chambers 47 and 50 and against the collars 56.

A pair of pistons 58 is provided, one being located in the small chamber 47 so as to separate it from the large chamber 46, the other piston being located in the small chamber 50 so as to separate it from the large chamber 49. The pistons 58 are engageable with the extensions 55 on the movable member 51. The ends of the pistons 58 engaging the extensions 55 are chamfered as are the ends of the extensions 55. The pistons 58 have the same diameter as the lands 52 and 53.

The delivery passages 36 and 37 in the housing 32 are connected with delivery lines 59 and 59a, respectively, which, as shown in FIGS. 1 and 5, are connected to opposite ends of a pump control cylinder 60 at opposite sides of a piston 61 slidably mounted in the cylinder 60. A piston rod 62 is secured to the piston 61 and projects through the ends of the cylinder 60. One end of the piston rod 62 is connected through a link 63 with a pivotal arm 64, which controls the angle of the pump 11 with respect to the input member 10. The end of the piston rod 62 opposite that connected to the arm 64 abuts an inner member 65 of a pump feedback device 66, which also includes an outer member 67 tightly enclosing the inner member 65. The inner member 65 has a wide annular peripheral groove 68 and two narrow shallow helical grooves 69 and 70 extending from the ends of the groove 68 to the ends of the inner member 65. Each of the helical grooves 69 and 70 and the interior of the outer member 67 forms a restricted orifice of appreciable length. The outer member 67 has a wide internal annular peripheral groove 71 which remains in overlapping engagement with groove 68 of the inner member 65 in various positions of the inner member.

A line 72 connects the groove 71 with a source of hydraulic fluid under pressure, for example, at 150 lbs. per square inch. The outer member 67 has internal annular peripheral grooves 73 and 74 which lie on opposite sides of the groove 71 and communicate with the helical grooves 69 and 70 of the inner member 65. Beyond the grooves 73 and 74 there are connections 75 and 76 to drain. A spring 77 which maintains the inner member 65 in engagement with the piston rod 62 acts between the ends of the inner member 65 and the end of the outer member 66 away from the piston rod 62. Lines 78 and 79, respectively, connect the annular grooves 74 and 73 in outer member 67 with small chambers 50 and 47 in valve housing 32, as shown in FIGS. 1, 3, and 5.

VALVE 80, COMPARATOR — FIGURE 3

As shown in FIG. 3, a motor valve 80 comprises a housing 81 and a movable, pressure comparator member 82 shiftably mounted in a central longitudinal bore 83 in the housing 81. The movable member 82 is a valve spool, provided with two end lands 84 and a central land 85 spaced from one another by reduced portions 85a. The movable member 82 also has at its ends reduced extensions 86, one of which projects into a chamber 87 forming part of a space 88 in the body 81, and the other into a chamber 89 forming part of a space 90 in the body 81. The spaces 88 and 90 also include chambers 91 and 92, respectively. The chambers 87 and 89 are adjacent the ends of the bore 83, are enlarged with respect thereto, and so may be described as large near chambers. The chambers 91 and 92 are spaced from he ends of the bore 83, are reduced in relation to the chambers 87 and 89, respectively, and so may be described as small far chambers. Pistons 93, which are located in the chambers 91 and 92 of the spaces 88 and 90, separate chamber 91 from chamber 87 and chamber 92 from chamber 89. The pistons 93 have the same diameter as the lands 84 and 85 of the member 82. The ends of the pistons 93 engaging the extensions 86 are chamfered, as are the ends of the extensions.

A central annular internal peripheral groove 94 formed on the bore 83 in the body 81 is connected by a line 95 and the groove 40 in the housing 32 with the high-pressure line 35. At opposite sides of the groove 94 in spaced relation thereto, annular peripheral grooves 96 and 97 are formed in the central bore 83 of the housing 81 and are connected to drain through the lines 38 and 39, respectively. At opposite sides of the groove 94 and between the same and the grooves 96 and 97, annular peripheral grooves 98 and 99 are formed on the central bore 83 and, as shown in FIG. 4, are connected by lines 100 and 101, respectively, with a motor-control cylinder 102 near its ends and at opposite sides of a piston 103 slidably mounted in the cylinder 102.

Again with reference to FIG. 3, the small chamber 91 of the space 88 is connected by a line 104 with drain. Two collars 105 are provided, one collar being engageable with the end of the large chamber 87 adjacent the bore 83 and with a shoulder formed between one reduced extension 86 and the adjacent land 84 of the movable member 82, the other collar 105 being engageable with the end of the large chamber 89 adjacent the bore 83 and with a shoulder formed between the other reduced extension 86 and the adjacent land 84. The collars 105 are urged against the parts just described by springs 106 which act between the collars 105 and the ends of the large chambers 87 and 89 away from the bore 83. The small chamber 92 is connected by a line 107 with the line 27. The large chamber 89 is connected with the line 27 by a line 107a and the large chamber 49 in the valve housing 32.

As shown in FIG. 4, the piston 103 is secured to a rod 108 one end of which projects beyond one end of the cylinder 102 and is connected with a link 109 which is in turn connected with a pivotal arm 110, which controls the angle of the motor 15 with respect to the output member 16. The other end of the piston rod 108 projects from the other end of the cylinder 102 into an outer member 11 and into engagement with one end of an inner member 112 slidably mounted in the outer member 111. The members 111 and 112 and a spring 113 constitute a motor feed-back device 114. The spring 112a which acts between the end of the inner member 112 remote from the piston rod 108 and a closed end of the outer member 111 remote from the cylinder 102, maintains the inner member 112 in engagement with the piston rod 108. The space in the outer member 111 where the spring 113 is located is connected to drain.

The inner member 112 is provided with a centrally located narrow shallow helical groove 118 and two wide external peripheral annular grooves 119 and 120 into which the ends of the helical groove 118 open. The helical groove 118 and the interior of the outer member 111 form a restricted orifice of appreciable length. The annular groove 119 is connected with a source of hydraulic fluid under some intermediate pressure such as 250 lbs/in.$^2$ by a line 121 connected with the outer member 111. The annular groove 120 is connected with a source of hydraulic fluid under some lower intermediate pressure such as 150 lbs/in.$^2$ by a line 122 connected with the outer member 111. A line 123 connects the large chamber 87 in the housing 81 with an annular peripheral groove 124, which is located in the interior of the outer member 111 between and spaced from the regions at which the lines 121 and 122 are connected. The groove 124 is overlapped by an intermediate region of the helical groove 118 on the inner member 112 or the annular groove 120 or both the groove 120 and the adjacent end region of the helical groove 118, depending on the position of the member 112 in the piston 103 in the cylinder 102.

This two-path hydrostatic transmission has settings providing lo-hi ranges forward and rearward as follows.

FORWARD RANGES (2)

In the transmission setting providing a lo-forward speed range, the motor head 15 is fixed at a large acute angle from straight or flat alignment axially and the pump head 11 varies from a zero or flat angle corresponding to zero pumping and zero vehicle speed to a large forward acute angle corresponding to maximum forward pump output. The motor being forwardly driven thereby runs at half speed more or less at the highest.

In the setting providing a hi-forward range, the head angle of the pump 11 is fixed at the large forward acute angle corresponding to maximum forward pump output. The motor head angle varies from the large acute angle corresponding to about half speed to a small acute angle corresponding to full forward speed at full pump output.

REARWARD RANGES (2)

In the setting providing a lo-rearward speed range, the motor head 15 is fixed at a large acute angle from straight or flat alignment and the pump head angle varies from a zero or flat angle corresponding to zero pumping and zero vehicle speed to a large acute angle corresponding to maximum rearward pump output. The motor being driven rearwardly thereby runs at half speed more or less at the highest.

In the setting providing a hi-rearward range, the pump head angle is fixed at the large acute angle corresponding to maximum rearward pump output. The motor head angle varies from a large acute angle to a small acute angle corresponding to full speed rearwardly at full pump output.

SERVO STRUCTURE PER SE

In respect of the essentials for a basic servosystem per se, the mechanisms provided are a compound follower valve 66 (FIG. 1) having a source of high and low pressure, hydraulic head setting mechanism 60 causing the valve to take an actual speed position corresponding to the angular position of the tilting pump head 11, a second compound valve 19 having a source of high and low pressure, manual mechanism 18 to move the second valve to a desired speed position corresponding to the angular position of the manual mechanism 18, and a pressure movable comparator means 31 in the output of the valves hydraulically disposed to operate the hydraulic mechanism 60 to a point at which the outputs reach a balance indicative of correspondence in angular position between the manual mechanism 18 and the hydraulic mechanism 60.

SERVO STRUCTURE TWo RANGES

In order to move the tractor through two ranges of speed in each direction, the mechanisms provided consist of the foregoing pump control system including the compound follower valve and the compound second valve for a two directional operation, plus essentially the same system for the motor except including merely a simple follower valve and simple second valve for such motor.

SERVO STRUCTURE BOTH SIDES

Steering by driving is accomplished by operating the two tracks of a tractor at differing speeds. In order to produce differing speeds, mechanism provided at one side is a duplicate of the mechanism provided at the other side and each will consist of a pump at the side with the endless track at that side, a drive motor mechanically connected to the track and hydraulically connected to the pump, and the necessary servo structure of the foregoing character for each of the pump and the motor. A splitter box transmits power to the respective pumps at the sides of the tractor from a common tractor propulsion engine.

SPLITTER BOX — FIG. 6

The tractor engine, according to the showing of this Figure, is coupled in common to the FIG. 1 systems through the splitter box.

LO-FORWARD SPECIFICALLY

Reference is now made to FIG. 2. The pressures in the lines 27 and 28 are dependent on the pressure in the line 26 and on the positions of overlap of the helical grooves 21 and 22 with the annular grooves 29 and 30 connected to the lines 27 and 28. The pressure along the helical grooves 21 and 22 each of which combines with the outer member 19 to form a restricted orifice of appreciable length, as previously stated, varies from the intermediate pressure of about 250 lbs./in.$^2$ existing in the line 26 and the drain pressure. Thus, the pressure in each of the grooves 21 and 22 varies from a maximum at the end thereof at the wide annular groove 20 to a minimum at the end of the helical groove 21 or 22 away from the groove 20. So, the pressure existing in the line 27 or 28 depends on how far along the helical groove 21 or 22 the groove 29 or 30 is located with reference to the wide annular groove 20. Thus, when the inner member 18 is centrally located in the outer member 19, the pressure in the lines 27 and 28 are equal, with the result that equal pressures exist in the chambers 46 and 48 at the ends of the housing 32. Consequently, when as shown in FIG. 3, the lands 52 and 53 overlap the grooves 43 and 44 connected with the drain lines 38 and 39 and the groove 40 connected with the pressure line 35, flow to and from the delivery lines 58 and 59 is blocked and the piston 61 is main-tained in a central position in the cylinder 60, with the result that the pump 11 is aligned with respect to the input member 10 and thus delivers no fluid to the motor 15.

When the inner member 18 is moved with respect to the outer member 19 to the right of the position shown in FIG. 2, the line 27 is at drain pressure, and line 28 is at a higher pressure between drain pressure and that of line 26. This is due to the fact that the groove 29 connected to the line 27 is overlapped by reduced portion 23 of the inner member 18 connected by passages 24 and 25 to drain, and that the groove 30 connected to the line 28 is overlapped by a portion of the helical groove 22 intermediate its ends. The movable member 51 now moves downwards as viewed in FIG. 3, with respect to the housing 32 downwards as viewed in FIG. 3, from the position of FIG. 3, because the pressure in the chamber 46 is higher than that in chamber 49 and also than that in chamber 50, which is at drain pressure because of the central position of the member 65, as shown in FIG. 5. Downward movement of the movable member 51 from the position of FIG. 3 makes the middle land 53 and the lower end land 52 uncover groove 40 and groove 42, respectively, in such a fashion that the delivery line 59 is connected to the pressure line 35 and the delivery line 59a with the drain line 39.

Thus, the piston 61 moves in cylinder 60 to different points to the right as viewed in FIG. 5, from the position of FIG. 5, causing the pump 11 to move to positions to and including various displacement settings including the lower phantom position of FIG. 5, with the result that pressure fluid is supplied to and from the motor 15 to the lines 13 and 14 so as to make the motor 15 drive the output member 16 at actual speeds in a direction that may, for convenience, be termed "forward". As the piston 61 moves to the right and takes along the piston rod 62, the spring 77 makes the inner member 65 also move to the right of the position shown in FIG. 5. The result is that the annular groove 74 of the outer member 67 in effect moves along the helical groove 70 in a direction toward the annular groove 68 which is under the pressure of the fluid supplied by the line 72. Consequently, the pressure in line 78 and chamber 50 in the housing 32 increases to that existing in the chamber 46. So the movable member 51 is shifted back up to the position of FIG. 3 in which flow to and from the delivery lines 59 and 59a and the cylinder 60 is blocked so that the piston 61 and the pump 11 are for the moment fixed against further movement.

For various positions to the right of that shown in FIG. 2 for the inner member 18, there are various positions of the piston 61 to the right and the pump 11 downward from the full-line position shown in FIG. 5, because as the member 18 moves farther to the right, the pressure in line 28 continues to rise, because the groove 30 overlaps a portion of the helical groove 22 closer to the end at the annular groove 20. The increased pressure in the chamber 46 in the housing 32 necessitates an increased balancing pressure in the chamber 50 in the housing 32. The increased pressure in chamber 50 can result only from a movement of the member 65 to the right causing the overlap between annular groove 74 and helical groove 70 to occur at a region of the helical groove closer to the annular groove 68. This can occur only with rightward movement of the piston 61 and downward movement of the pump 11.

The angled position of the pump 11 with respect to the input member 10 is limited by a stop (not shown), and so the rightward position of the piston 61 in the inner member 65 is also limited. This means that if the member 18 is moved to the right farther than that required for moving the pump 11 down to the final phantom position limited by the stop, the pressure in the chamber 50 in the housing 32 will not increase to that in the chamber 46, and so the movable member 51 stays down from the position of FIG. 3, with the result that the groove 40 in the housing 32 continues unblocked by the central land 53.

The pressure in chamber 92 of housing 81 of motor valve 80 is, of course, equal to that in pressure line 28 because of the line 107 connecting chamber 92 with line 28. So as the inner member 18 continues to move to the right as viewed in FIG. 2 to bring line 28 to a pressure approaching that in line 26, the pressure in chamber 72 of motor valve 80 can, by approaching the 250 lbs. in line 26, surpass that in chamber 87, which is at the 150 lbs. existing in line 122. At the outset and during the early movement of the inner member 18 to the right, as viewed in FIG. 2, the line 28 is, of course, at or near drain pressure, as is chamber 92, connected by line 107 with line 28, and so the greater pressure in chamber 87 holds the movable member 82 of motor valve 80 in the position of FIG. 3. In this position of member 82, the piston 103 is in the position of FIG. 4, because the cylinder 102 above piston 103 is connected with high-pressure line 35 through groove 40 in pump valve 31, line 95, groove 94 in the motor valve 80, reduced portion 86, groove 98, and line 100, and the cylinder 102 below piston 103 is connected to drain through line 101, groove 99 in motor valve 80, reduced portion 86, groove 97, and line 39. As a result, the motor 15 stays while in the lo-forward range always at a maximum angle represented by the full-line position of FIG. 4, for example, 35°. A stop (not shown) at the motor 15 limits its maximum angle and acts through arm 110, link 109, and piston rod 108 to limit piston 103 to the position shown.

HI-FORWARD — SPECIFICALLY

When, as mentioned, the pressure in chamber 92 becomes greater than that in chamber 87, the movable member 82 of the motor valve 80 moves upward as viewed in FIG. 3, reversing the position of central land 85 with respect to groove 94 and the connection of lines 100 and 101 to drain and pressure fluid. The result is that the piston 103 moves upward as viewed in FIG. 4 and acts through the piston rod 108, link 109, and arm 110 to reduce the angle of the motor 15 with respect to the output member 16 and bring the motor to or toward the phantom position which is limited by a stop (not shown). The minimum angle of the motor 15 may be 19° for example. These progressive decreases in the angle of the motor 15 result in proportionate increases in speed of the output member 16 throughout the hi-forward range, because of the way in which the motor 15 operates. As the piston 103 moves upward in the cylinder 102, the spring 113 makes the member 112 follow the piston rod 108 upward. In effect, the annular groove 124 and line 123 are moved along the helical groove 119 toward the end thereof connected with the relatively high intermediate pressure in line 121 by way of the reduced portion 119.

The result is that the pressure in the line 123 and the chamber 87 increases from the 150 lbs. existing in the line 122 toward the 250 lbs. existing in line 120. When a balance is achieved in the pressures in chambers 87 and 92, the movable member 82 is brought back to an intermediate position in which the lands 84 and land 85 completely overlap grooves 96 and 97, groove 94, respectively, and so flow to and from the cylinder 102 in the lines 100 and 101 is blocked, with the result that the piston 103 and motor 15 are fixed in position. This is the way in which some angle of motor 15 between the maximum and minimum angles is achieved. The minimum angle of the motor 15 is determined by a stop as previously described, and at the minimum angle the shift of helical groove 118 with respect to groove 129 and line 123 may be such as to provide a pressure in chamber 87 equal to that in chamber 92.

If the inner member 18 is moved to the left, back toward the position of FIG. 2, the groove 30 in the outer member 19 is moved relative to the helical groove 22 away from the high-pressure end thereof so that the pressure in line 28 and chamber 92 of the motor valve 80 is lowered below that in chamber 87. The result is that the motor valve 80 is moved back toward the position of FIG. 4, causing the line 101 to be connected to drain and line 100 to be connected to the pressure line 35 by way of grooves 40 and 98 in line 95. As a consequence, the piston 103 moves so as to increase the angle of the motor 15 with respect to the output member 16. Such movement of the piston 103 also moves the helical groove 118 on the inner member 112 along annular groove 124 and line 123 so as to lower the pressure in chamber 87. Downward movement of the inner member 112 causes the pressure in line 123 and the chamber 87 at the top of the movable member 82 of the motor valve 80 to be lowered toward that pressure existing in line 122.

If a pressure balance is thereby achieved between the chamber 87 at the top of the movable member 82, and the pressure in the chamber 92 at the bottom of the movable member 82, the movable member 82 is returned to the position in which it blocks flow into and out of the cylinder 102 via the lines 100 and 101 and holds piston 103 and motor 15 against movement. Thus, downward movement of the piston 103 and the associated movement of the motor back toward the full-line position of FIG. 4 occur. When sufficient movement of the inner member 18 back toward the position of FIG. 2 occurs, the pressure in the chamber 92 falls below the minimum pressure of about 150 lbs. in the chamber 87 as determined by line 122. The movable member 82 of motor valve 80 assumes the position of FIG. 3 and stays there. As a result, lines 100 and 101, respectively, stay connected to high-pressure line 35 and drain, piston 103 stays in the position of FIG. 4, and the motor 15 in the full-line position of FIG. 4.

Let us now consider how movement of the inner member 18 to the left toward the position of FIG. 2 affects pump 11. Leftward movement of inner member 18 reduces pressure in line 28 and chamber 46 of pump valve 46 below that in chamber 50, and so the movable member 51 moves upward as viewed in FIG. 3, connecting delivery line 59 to drain and delivery line 59a to the pressure line 35. The result is that the piston 61 and inner member 65 move to the left as viewed in FIG. 5, causing the helical groove 70 to shift with respect to the annular groove 74, with the result that a lower pressure is achieved in groove 74 as well as in chamber 50, connected with groove 74 by line 78. When the pressure in chamber 50 is lowered to that in chamber 46, the movable member 51 returns to the position of FIG. 3, causing the delivery lines 59 and 59a to the cylinder 60 to be blocked. Thus, the piston 61 and the pump 11 are again fixed in position, the new position of the pump 11 involving less angle with respect to the input member 10.

LO-REARWARD — SPECIFICALLY

In case the drive of the output member 16 is to be reversed with respect to the input member 10, the inner member 18 is moved leftward from the neutral position of FIG. 2. In that case, the line 28 is at drain pressure, since the annular groove 30 at the time is at or beyond the end of the helical groove 22 remote from the annular groove 20. At the same time, the pressure in the line 27 is increased, because in effect the annular groove 29 connected with the line 27 is moved along the helical groove 21 toward the end thereof at the annular groove 20. The result is that the pressure in chamber 49 at the lower end of the movable member 51 is increased, resulting in upward movement of the movable member 51 to a position in which the delivery line 58 is connected through the groove 43 and line 38 to drain, and the delivery line 59 is connected to the pressure line 35. The result is leftward movement of the piston 61 and the cylinder and movement of the pump 11 from the aligned full-line position of FIG. 5 to or toward the upper angled position of FIG. 5. As the piston 61 moves to the left, the piston rod 62 moves the member 65 to the left, in effect causing the groove 73 to overlap a portion of the helical groove 69 nearer the annular groove 68. The result is an increase in pressure in the line 79 and the chamber 47 at the upper end of the movable member 51. When a balance is achieved in the chambers 47 and 50, the movable member 51 returns to the blocking position of FIG. 3, and further leftward movement of the piston 61 is stopped.

HI-REARWARD — SPECIFICALLY

In the operation of the motor valve 80 in reverse drive, the chamber 89 functions as does the chamber 92 in forward drive. The chamber 89 is connected to the line 27 through the line 107a and chamber 49. When the inner member 18 moves sufficiently to the left as viewed in FIG. 2, the movement of the helical groove 21 along the annular groove 29 increases the pressure in line 27 and chamber 89 of motor valve 80 until said pressure surpasses that in chamber 87. The result is movement of the member 82 of motor valve 80 upward as viewed in FIG. 3 from the position of FIG. 3 so that the pressure and drain connections to lines 100 and 101 are reversed, the piston 103 moves upward as viewed in FIG. 4 from the position shown, and the angle of the motor 15 with respect to the output member 16 is decreased.

The remainder of the drive and control for a reverse direction of operation may be understood in reference to what has already been set forth in regard to a forward direction. Forward drive of the motor 15 and output member 16 is achieved by an angling of the pump 11 in one direction from alignment with the input member, whereas reverse drive of the motor 15 and output member 16 is achieved by angling of the pump in the other direction. Both for forward drive and for reverse drive, the motor 15 is angled in only one direction from alignment with the output member 16. The angling of the pump 11 in the two directions from the position of alignment shown, these positions being shown by the phantom lines in FIG. 5, is achieved by the two helical grooves 21 and 22, as shown in FIG. 2, at opposite sides of the wide groove 20 on the movable shift member 18; two helical grooves 69 and 70, as shown in FIG. 5, at the opposite sides of the annular groove 68 on the movable member 65 in the follow-up or feedback device 65; four chambers 46, 47, 49, and 50 as shown in FIG. 3, at the ends of the housing 32; and the two pistons 58 which, as shown in FIG. 3, are separate from the reduced extensions 55 at the ends of the movable member 51 so as to move away from the movable member 51 in one condition of operation and to move toward it in the other condition.

An important feature of the present invention is the various restricted orifices of appreciable length such as those formed by the helical grooves 21 and 22 in the interior of the outer member 19, as shown in FIG. 2, those formed by the helical grooves 69 and 70 in the interior of the outer member 67, as shown in FIG. 5, and that formed by the helical groove 118 in the interior of the outer member 111. The significant thing about these restricted orifices of appreciable length is that the pressure of the fluid flowing through the orifices varies considerably from one end of each orifice to the other, because it is restricted and long.

Moreover, there is a special advantage in forming each orifice with the help of a helical groove. The length of the helical groove is a multiple of the length of the portion of the member on which the helical groove is formed. So there need be only a relatively small longitudinal movement of said member with respect to its associated member to produce a relatively big movement along the helical groove of the pressure takeoff point. Thus, a little movement of the grooved member can produce a big change in pressure.

There are special advantages in the control apparatus or valve 31 for the hydrostatic pump 11. This apparatus 31 is adapted for use with the controller 17 of FIG. 2 having two helical grooves 21 and 22 forming two restricted orifices as well as the pump feedback 66 of FIG. 5 having two helical grooves 69 and 70 also forming two restricted orifices, because apparatus 31 has two pistons 58 operating with inner member 51 providing four end chambers 36, 47, 49, and 50 in the housing 32. Thus, there are the two chambers 36 and 49 at the ends of the housing 32 having the pressures at the takeoff points in the helical grooves 21 and 22 for opening the pump valve 31, and two chambers 47 and 50 at the ends of the housing 32 having the pressures of the grooves 69 and 70 for closing the valve. This means that there can be both forward and reverse operation of the pump 11 produced by the positioning of the pump in the phantom positions shown above and below the full-line position in FIG. 5.

It is understood that the system of control disclosed in the present application is equally adaptable to a motor and pump either or both of which are swashplate type apparatus provided for driving one side of a so-called crawler tractor, a similar apparatus and control system being provided for driving the other side.

What is claimed is:

1. Servo mechanism with hydraulic follow-up comprising:
   a follower valve having a source of high and low pressure;
   hydraulic mechanism connected thereto, causing the valve to take a position corresponding to the angular position of said mechanism and to provide an actual-speed output at a pressure between high and low corresponding to said position;
   a second valve (19) having a source of high (26) and low pressure;
   manual mechanism (18) connected to the second valve, causing said valve to take a position corresponding to the angular position of the manual mechanism and to provide a desired-speed output at a pressure between high and low corresponding to the just said position; and
   comparator means (31 or 80) connected in the outputs of said valves effective to control the positions of the hydraulic mechanism and follower valve to a point at which the outputs reach an actual-speed desired-speed pressure balance indicative of correspondence in angular position between the manual mechanism and the hydraulic mechanism.

* * * * *